Patented Oct. 9, 1951

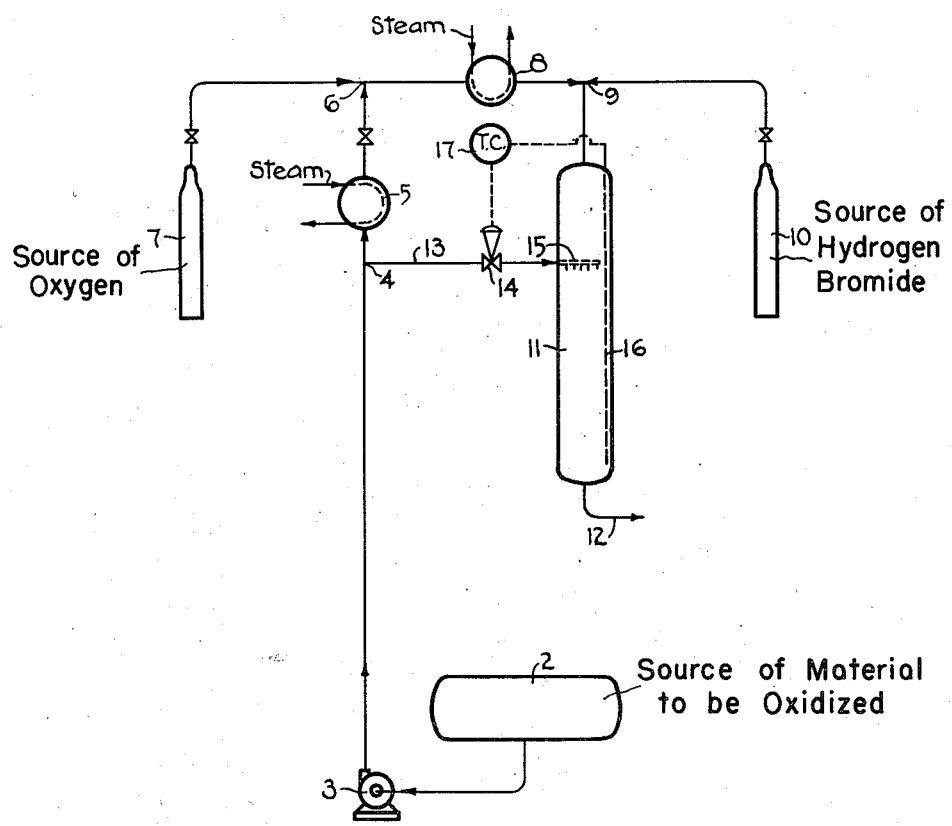
Fig. I

2,570,487

UNITED STATES PATENT OFFICE 2,570,487

TEMPERATURE CONTROL DURING EXOTHERMIC REACTIONS

William E. Ross and Eugene B. Fountain, Berkeley, Calif., assignors to Shell Development Company, San Francisco, Calif., a corporation of Delaware Application July 9, 1946, Serial No. 682,210

3 Claims. (Cl. 260—610)

This invention relates to the controlled catalytic non-explosive oxidation of various organic compounds containing at least one replaceable hydrogen atom to obtain valuable predetermined oxygenated compounds such as carboxylic acids, alcohols, ketones, and organic peroxides or hydroperoxides. The invention particularly relates to a method of controlling the reactor temperature during such reactions whereby a high yield of the desired products is obtained.

The oxidation of various hydrocarbons has been practiced for some time, both catalytically and non-catalytically. However, most of the processes known to the prior art have had certain drawbacks, such as the decomposition of the hydrocarbon with the formation of carbon, carbon dioxide and oxygenated hydrocarbons having fewer carbon atoms than the starting material. Further, such processes have often resulted in the production of a mixture of compounds which were oxidized in varying degrees. Many of the compounds so produced would be valuable if isolated, but were produced in mixtures which were difficult to separate so that they were of slight value.

Recently it has been found that by conducting the oxidation in the presence of a catalyst containing or comprising hydrogen bromide, high yields of predetermined oxygenated compounds could be obtained. Thus by proper selection of the starting material and the reaction conditions, one may obtain carboxylic acids, ketones, organic hydroperoxides and/or organic peroxides in a high degree of purity with high yields. For instance, U. S. Patent 2,395,523 of Vaughan and Rust discloses and claims a process for producing tertiary alkyl peroxides and tertiary alcohols by oxidizing a tertiary hydrocarbon in the presence of hydrogen bromide. U. S. Patent 2,369,182 of Rust and Vaughan discloses and claims a method of oxidizing unsaturated organic compounds in the presence of hydrogen bromide to produce unsaturated oxygenated and halogenated organic compounds. U. S. Patent 2,369,181 of Rust and Vaughan discloses and claims the oxidation of alicyclic hydrocarbons in the presence of hydrogen bromide to produce cyclic oxygenated compounds. U. S. Patent 2,373,240 discloses and claims the oxidation of halo-substituted unsaturated organic compounds in the presence of hydrogen bromide to produce halogenated oxygenated organic compounds. In addition to the above, by the use of hydrogen bromide as a catalyst, one may oxidize saturated hydrocarbons in the presence of hydrogen bromide to obtain ketones and saturated organic acids and one may oxidize aromatic compounds to obtain oxygenated aromatic compounds.

All of the above mentioned inventions are predicated upon the discovery that the presence of hydrogen bromide during the oxidation of hydrocarbons controls the oxidation so that the oxidation occurs on the carbon atom to which a halogen atom would attach itself if the organic compound were subjected to halogenation. Further, the hydrogen bromide retards the complete combustion of the organic material, acts as a catalyst or initiating agent for the claim reaction and inhibits decomposition of the carbon skeleton so that the resulting oxygenated compounds have at least as many carbon atoms as the starting material.

Any organic compound which contains at least one replaceable hydrogen atom is suitable for use in the present invention. One may use aliphatic hydrocarbons, as well as aromatic hydrocarbons, alkylated aromatic hydrocarbons, alicyclic hydrocarbons as well as their derivatives, such as products of partial halo-substitution, nitriles, ketones, alcohols, acids and the like. A particularly valuable class of materials which may be used in carrying out the invention comprises organic compounds containing a tertiary carbon atom of aliphatic character. The preferred class of organic compounds which may be used as the starting material comprises the saturated aliphatic hydrocarbons containing at least one tertiary carbon atom, as well as their halo-substituted derivatives. The process is particularly applicable to those compounds of the above specified preferred class which are normally gaseous. The following is a non-limiting, representative list of saturated aliphatic hydrocarbons (containing at least one tertiary carbon atom) which may be oxidized in accordance with the above-mentioned and herein-below more fully discussed process: isobutane, 2-methyl butane, 2-ethyl butane, 2-methyl pentane, 3-methyl pentane, 2,3-dimethyl butane, and their homologs. The halogenated derivatives may contain one or more halogen atoms attached to primary and/or secondary carbon atoms so that the tertiary carbon atom or atoms contain a replaceable hydrogen atom. Examples of these compounds are: 1-halo-2-methyl propane, 1-halo-2-ethyl propane, 1-halo-2-methyl butane, 1-halo-3-methyl butane, 2-halo-3-methyl butane, and the like and their homologs. Also, one or more of the aliphatic radicals attached to the tertiary carbon atom may be substituted by an aryl or aralkyl radical, examples of such compounds being isopropyl benzene, 1-phenyl-1-methyl propane, 1-phenyl-2- methyl propane, and the like. The following is a representative list of other organic compounds which may be treated in accordance with the process of the invention: straight-chain aliphatic hydrocarbons such as ethane, propane, n-butane, n-pentane, and the like; alicyclic hydrocarbons, e. g., cyclobutane, cyclopentane, and their homologs; alkylated cycloparaffins such as methyl cyclopentane, methyl cyclohexane, and the like; aromatic and substituted aromatic hydrocarbons such as naphthalene, toluene, xylenes, ethyl benzene, n-propyl benzene, butyl benzenes, cumene, cymene, durene, and the like; and the partially halo-substituted derivatives of the above-mentioned hydrocarbons, e. g., ethyl chloride, dichlorethane, dibrompropanes, monochlor cyclopentane, benzyl chloride, benzyl bromide and the like. Instead of employing individual members of the above class, mixtures containing one or more of the above organic compounds or of these compounds with other organic compounds may also be subjected to the hydrogen bromide-catalyzed oxidation.

Although hydrogen bromide catalyzed reactions may be conducted in either the liquid or vapor phase, the present invention is applicable to reactions conducted in the vapor phase or two phase liquid-vapor system. It is preferred to operate substantially completely in the vapor phase.

It has previously been discovered that the hydrogen bromide catalyzed oxidations may be more efficiently performed in unpacked vessels having a large volume in comparison with their surface area. This is particularly true when the reaction is conducted in the vapor phase, and it has been found that the use of such vessels having a high ratio of free space to surface area permits a high consumption of oxygen and gives high yields of valuable organic peroxides and hydroperoxides. Inasmuch as the present invention is particularly applicable to vessels having a large amount of free space in comparison with the surface area, the invention is of particular value when it is desired to favor the production of large quantities of peroxides and hydroperoxides. However, the invention may be used in connection with reactions where packed vessels are used and/or those vessels having a small ratio of free space to surface area.

In using large vessels, i. e., vessels having a large amount of free space, it was found that a difficult problem of cooling arose because of the highly exothermic nature of the oxidation reaction. When cooling means were applied to the outside of the vessel, the gas within served as such a poor heat conductor that temperatures near the center of the vessel rose to dangerous heights. Inasmuch as the oxygenated hydrocarbons and particularly peroxides and hydroperoxides are unstable at high temperatures, this causes a decomposition of the desired product and is, therefore, undesirable. Further, the increase in temperature may be sufficient to cause an explosion.

It has been found that the reaction temperature may be readily maintained at the desired point by injecting in the reactor a liquid which is vaporized at or below the temperature encountered in the reactor. This method of cooling may be used in conjunction with or instead of conventional cooling means applied to the outside of the reaction vessel. The liquid selected may be one of the reactants or it may be a liquid which is inert to the conditions inside the reactor. In this way a controlled amount of liquid may be added to the reactor and the latent heat of vaporization will cool the reactor to the desired temperature and such temperature may be maintained substantially constant throughout the reactor.

It is preferred to employ as the cooling liquid the same organic compound which is being oxidized. When this is done, the organic liquid feed is ordinarily split into two streams, one of which is vaporized and mixed with oxygen or an oxygen containing gas and injected into the reactor, and the other of which is injected into the reactor as a liquid. The portion of the organic feed which is injected as a liquid may be varied, either automatically or manually to maintain the reactor at the desired temperature.

A typical method of performing the invention is illustrated diagrammatically in Figure 1. This device was designed for the oxidation of isobutane to di-tertiary butyl peroxide and tertiary butyl hydroperoxide, but it is apparent that it could be adopted to carrying out any of the hydrogen bromide catalyzed reactions set forth above.

In Figure 1 there is illustrated a source of isobutane 2 and an isobutane pump 3. The isobutane from pump 3 is divided into two streams at elbow 4, one of which is passed through a vaporizer 5 and is mixed with oxygen at point 6 from a source of oxygen 7. The combined oxygen-isobutane stream is then passed through a feed preheater 8 where it is brought up to substantially reaction temperature and is mixed with hydrogen bromide at elbow 9 from a source of hydrogen bromide 10. The combined isobutane, oxygen and hydrogen bromide is then passed through reactor 11, and the oxygenated products are removed at 12 from the reactor. The distance from elbow 9 to reactor 11 should be kept as short as possible so that substantially all of the reaction will take place in reactor 11. Preferably the reaction vessel 11 is of glass or glass lined material. Other materials such as porcelain or vitrified clay or vessels lined with such materials are also suitable. The other portion of the isobutane feed which was split off at elbow 4 is conveyed through line 13 to valve 14 and is introduced into the reactor by means of jets 15. Valve 14 may be manually operated, but it is preferred to operate the valve automatically. For this purpose a thermocouple 16 is provided in the reactor 11 which is linked to a temperature controller 17. Temperature controller 17 is provided with means, such as are well known in the art, for controlling valve 14. Thus, temperature controller 17 may be set to maintain any desired temperature within the reactor and whenever the temperature exceeds this point, valve 14 will be opened to introduce isobutane and lower the reaction temperature. When the desired temperature has been reached, valve 14 will be partially closed so that the desired temperature will be maintained. Ordinarily, the amount of liquid hydrocarbon which is injected into the reactor is very small in comparison with the amount which is introduced as a vapor, so that it is unnecessary to reduce the amount of vapor feed to compensate for the amount of liquid feed.

Many variations of the above outlined apparatus are possible without departing from the spirit of this invention. For instance, the above apparatus was described as having a single jet and thermocouple. It is obvious that several spaced jets may be used, and this is particularly desirable in large reactors. A single thermocouple and temperature controller may be used to control several jets or an individual thermocouple and temperature controller may be used for each jet. Similarly a bypass valve may be used to bypass a portion of the liquid around valve 14. If such a device is used, the bypass valve would be normally set to provide the minimum amount of cooling liquid which is known to be necessary, and valve 14 would be used to control automatically the balance of the liquid so that a stable temperature would be maintained.

In operation it is preferred to maintain a reaction temperature of below 300° C. although some of the more stable compounds may be oxidized at somewhat higher temperatures. In the case of the branched chain hydrocarbons, it is preferred to operate at lower temperatures, not in excess of 200° C. The temperatures may be increased somewhat if an inert diluent, such as steam, is used in the reaction mixture. Some of the more readily oxidizable compounds may be oxidized at still lower temperatures such as from 150° C. to 180° C. or even lower.

Although the volumetric ratios of the mentioned organic starting material to oxygen may vary within relatively wide limits, it may be stated that satisfactory yields of the desired oxygenated compounds, e. g., hydroperoxides and/or diperoxides, may be obtained by using equivolumetric quantities thereof. With an increase in the ratio of oxygen to the organic material there is an increase in the rate of formation of the peroxides. However, any undue increase in this ratio is generally dangerous because of explosion hazards. The use of oxygen to hydrocarbon ratios considerably below equivolumetric generally does not lower the output of the desired oxygenated compounds per unit of time and at the same time increases the rate of consumption of oxygen and lessens potential explosion hazards.

The concentration of the hydrogen bromide in the reaction mixture may also vary within relatively wide limits. When applied to the oxidation of branched-chain paraffins, the use of relatively high concentrations of the hydrogen bromide tends to favor the production of high yields of di(tertiary organic) peroxides, whereas with relatively lower hydrogen bromide concentrations, other conditions being equal, the reaction mixture predominates in the desired organic hydroperoxides. The reaction may also be effected at atmospheric or superatmospheric pressures, although it is preferred to realize the reaction at superatmospheric pressures because under such conditions it is possible to obtain the desired controlled oxidation while using lower hydrogen bromide catalyst concentrations.

As has been hereinbefore mentioned the liquid which is injected for cooling purposes should be one which will be readily vaporized at the desired operating temperature of the reactor. The liquid may be one which is itself a reactant of the particular reaction. For instance, if one is oxidizing isobutane, one may use isobutane as the cooling liquid. Any of the reactants which have heretofore been mentioned are suitable for use as the cooling liquid. On the other hand, a liquid may be chosen which is inert under the reaction conditions and merely acts as a diluent after it has been vaporized. For instance, if one is oxidizing isobutane, normal butane or normal pentane may be used as the cooling liquids, since the straight chain hydrocarbons are stable under the conditions at which the branched chain hydrocarbons are oxidized. Water may also be employed as a cooling liquid. However, the latent heat of vaporization is so high for water that it must be employed in relatively small quantities compared with the amount of organic liquid required.

It has been found that to be most effective the liquid should be sprayed into the reaction zone so that it evaporates almost immediately. If desired, the jet for spraying the liquid may be covered with a mesh so that any liquid which does not immediately evaporate will not fall to the bottom of the reactor, but will remain suspended by the mesh until it evaporates.

The beneficial effects of the present invention are illustrated by the following example:

*Example I*

An apparatus was used substantially like that described above and illustrated by Figure 1. The reactor 11 consisted of a Pyrex glass tube 3″ in diameter and 10″ long. Thermal junctions were provided within the reactor so that the temperature could be measured at the top and bottom as well as at 3 equidistant intermediate points. It was found that when operating the reactor without injecting a cooling liquid, the temperature ranged from 216° C. at the top of the vessel to 170° C. at the bottom. When liquid isobutane was injected into the reactor, the maximum temperature was 188° C. while the minimum was 185° C. It is thus apparent that the present invention enables one to carry out the oxidation reaction with excellent control of the reaction temperature. The following data were obtained on a typical run of the apparatus described above. In this experiment isobutane was oxidized to tertiary butylhydroperoxide and di-tertiary butylperoxide and over 95% of the oxygen was consumed.

| Contact Time | Temperatures | | | | | Feed (Moles per liter per hour) | | | | Product | |
|---|---|---|---|---|---|---|---|---|---|---|---|
| | Top | ¾ | ½ | ¼ | Bottom | Isobutane | | Oxygen | HBr | Tertiary Butyl hydroperoxide | Di-tertiary Butyl Peroxide |
| | | | | | | Liquid | Vapor | | | | |
| 0.8 Min | 185° C. | 186° C. | 187° C. | 188° C. | 187° C. | 0.24 | 2.46 | 1.23 | 0.15 | 66% | 16% |

We claim as our invention:

1. In a process for the controlled oxidation of isobutane in the presence of hydrogen bromide to produce tertiary butyl peroxides, wherein gaseous isobutane, molecular oxygen, and a catalytic amount of hydrogen bromide as the only catalyst are mixed and the gaseous mixture is passed into and caused to react in a confined reaction zone devoid of packing and having a high ratio of free space to surface area at an elevated temperature, the improvement which comprises separately spraying into said reaction zone containing the reacting gaseous mixture a regulated minor amount of liquid isobutane and vaporizing the introduced liquid isobutane in said reaction zone in contact with the reacting gaseous mixture, whereby localized conditions leading to explosions are avoided.

2. In a process for the controlled oxidation of a tertiary aliphatic hydrocarbon in the presence of hydrogen bromide to produce a tertiary alkyl peroxide, wherein a gaseous mixture comprising the aliphatic hydrocarbon, molecular oxygen, and a catalytic amount of hydrogen bromide as the only catalyst is reacted in a confined reaction zone devoid of packing and having a high ratio of free space to surface area at an elevated temperature above the boiling point of the tertiary aliphatic hydrocarbon at the operating pressure, the improvement which comprises dispersing into said reaction zone containing the reacting gaseous mixture a separate stream of a regulated minor amount of the tertiary aliphatic hydrocarbon in the liquid state and vaporizing the dispersed hydrocarbon in contact with the reacting gaseous mixture, whereby localized conditions leading to explosions are avoided.

3. In a process for the controlled oxidation of a readily oxidizable hydrocarbon in the vapor state in the presence of hydrogen bromide to produce a peroxide compound, wherein a gaseous mixture comprising the readily oxidizable hydrocarbon, molecular oxygen, and a catalytic amount of hydrogen bromide as the only catalyst is reacted in a confined reaction zone devoid of packing and having a high ratio of free space to surface area at an elevated temperature above the boiling point of the readily oxidizable hydrocarbon at the operating pressure, the improvement which comprises separately dispersing into said reaction zone containing the reacting gaseous mixture a regulated minor amount of the readily oxidizable hydrocarbon in the liquid state and vaporizing the liquid hydrocarbon in said reaction zone in contact with the reacting gaseous mixture, whereby localized conditions leading to explosions are avoided.

WILLIAM E. ROSS.
EUGENE B. FOUNTAIN.

REFERENCES CITED

The following references are of record in the file of this patent:

UNITED STATES PATENTS

| Number | Name | Date |
|---|---|---|
| 1,741,394 | Ayres | Dec. 31, 1929 |
| 2,007,510 | Thornton | July 9, 1935 |
| 2,085,524 | de Simo et al. | June 29, 1937 |
| 2,303,075 | Frey | Nov. 24, 1942 |
| 2,314,297 | Watson | Mar. 16, 1943 |
| 2,331,343 | Phillips | Oct. 12, 1943 |
| 2,369,182 | Rust | Feb. 13, 1945 |
| 2,376,257 | La Comble | May 15, 1945 |
| 2,384,028 | Hall | Sept. 4, 1945 |
| 2,403,772 | Vaughan | July 9, 1946 |
| 2,406,851 | Redcay | Sept. 3, 1946 |
| 2,412,014 | Sherwood | Dec. 3, 1946 |